Figure 1:
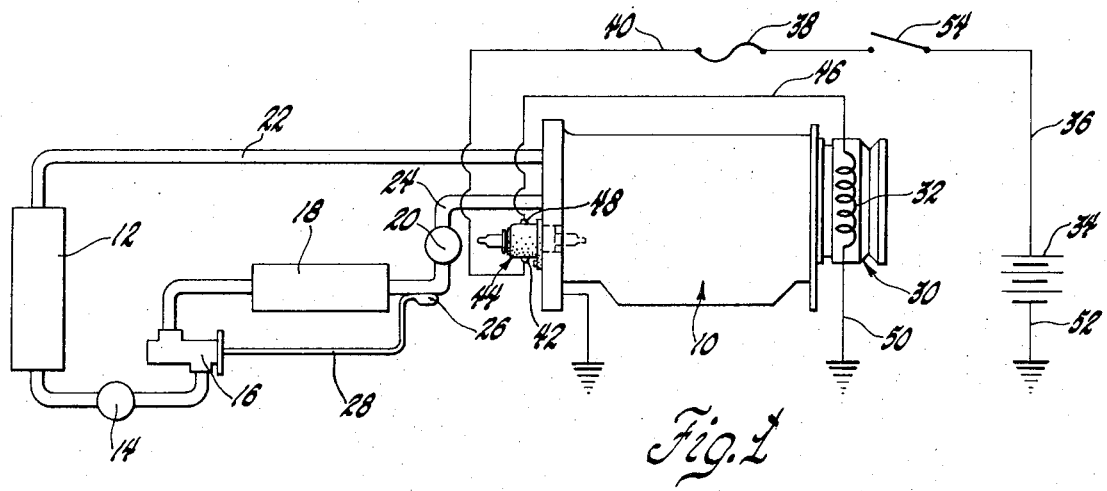

United States Patent

Jacobs

[15] 3,702,065
[45] Nov. 7, 1972

[54] AUTOMOBILE AIR CONDITIONING COMPRESSOR SUPERHEAT SAFETY AND AMBIENT SWITCH

[72] Inventor: James W. Jacobs, Dayton, Ohio
[73] Assignee: General Motors Corporation, Detroit, Mich.
[22] Filed: Aug. 6, 1971
[21] Appl. No.: 169,775

[52] U.S. Cl. .................. 62/158, 62/209, 62/228, 62/323
[51] Int. Cl. .......................................... F25b 27/00
[58] Field of Search........62/208, 209, 213, 217, 228, 62/323, 158

[56] References Cited

UNITED STATES PATENTS

| | | | |
|---|---|---|---|
| 2,978,879 | 4/1961 | Heidorn | 62/323 |
| 2,981,076 | 4/1961 | Gaugler | 62/323 |
| 3,047,696 | 7/1962 | Heidorn | 62/209 |

Primary Examiner—Meyer Perlin
Attorney—W. S. Pettigrew et al.

[57] ABSTRACT

In preferred form, a combination ambient temperature sensing switch and refrigerant superheat temperature responsive switch for an automobile air conditioning system having an electromagnetic clutch for transmitting engine rotation to a refrigerant compressor. The ambient temperature sensing portion of the switch is connected between the automobile battery and the coil of the clutch for energizing the coil whenever ambient temperatures are above a predetermined level. The refrigerant temperature responsive portion of the switch is connected between the battery and a fuse in short-circuit relation to the clutch coil to cause the fuse to blow in response to a predetermined maximum refrigerant temperature which closes the switch. A thermistor in circuit with the refrigerant temperature responsive switch delays the short circuiting of the clutch coil to prevent immediate blowing the the fuse.

2 Claims, 2 Drawing Figures

PATENTED NOV 7 1972 3,702,065

INVENTOR.
James W. Jacobs
BY
K.H. MacLean, Jr.
ATTORNEY

AUTOMOBILE AIR CONDITIONING COMPRESSOR SUPERHEAT SAFETY AND AMBIENT SWITCH

This invention relates to an automobile air conditioning system and more particularly to a combination ambient temperature responsive control for energization of an electromagnetic clutch above a predetermined ambient temperature and a refrigerant temperature responsive switch to de-energize the clutch when refrigerant temperatures exceed a predetermined level.

Automobile air conditioning systems commonly utilize a refrigerant compressor driven by the automobile engine through an electromagnetic clutch with a coil. It is undesirable to operate the air conditioning system below a predetermined ambient temperature range of approximately 30° – 35° F. Operation below this temperature range will cause frost to form on the evaporator and block air flow therethrough. A portion of the present air conditioning switch assembly senses ambient temperatures and closes above the 30° – 35° F. range to energize the clutch coil and activate the air conditioning system when the automobile engine is running.

When the refrigerant charge level within the air conditioning system falls below a predetermined quantity which may be insufficient for proper compressor cooling and lubrication, it is desirable to deactivate the compressor until the charge level is replenished. Operation with an insufficient charge level causes the refrigerant temperature in the suction line between the evaporator and the intake of the compressor to be increased above a predetermined level. This is partially because there is insufficient flow of refrigerant through the evaporator which causes refrigerant in the evaporator to become superheated by the heat input to the evaporator. Superheat of refrigerant is a measure of the temperature of refrigerant above its boiling point at a given pressure.

The present combination switch assembly includes a refrigerant temperature responsive and a pressure responsive switch portion in heat transfer contact with refrigerant in the inlet of the compressor which closes in response to a predetermined high refrigerant temperature or a predetermined low refrigerant pressure. When the refrigerant temperature responsive switch portion closes, the compressor's clutch coil is shorted by the switch and a fuse in circuit with the automobile battery and the switch is blown to render the compressor inoperative. A time delaying thermistor in circuit with the refrigerant temperature responsive switch portion prevents deactivation of the air conditioning system when high inlet temperatures of the compressor are encountered temporarily due to an operative cause such as rapid acceleration of the automobile rather than a low charge level.

Therefore, an object of the invention is to provide a combination ambient temperature responsive switch for energizing a compressor clutch coil above a predetermined minimum ambient temperature and a refrigerant temperature and pressure responsive switch which closes to deactivate the compressor clutch coil in response to a predetermined maximum refrigerant temperature level in the compressor inlet and in response to a predetermined low refrigerant pressure.

A further object of the invention is to provide a combination ambient temperature responsive switch for energizing a compressor clutch coil above a predetermined minimum ambient temperature and a refrigerant temperature and pressure responsive switch which closes in response to a predetermined high refrigerant temperature in the compressor's inlet and a predetermined low pressure of refrigerant to short the compressor clutch coil and resultantly blow a fuse to render the air conditioning system inoperative until the fuse is replaced and the refrigerant charge level is replenished.

Further objects and advantages of the present invention will be apparent from the following detailed description, reference being had to the accompanying drawings in which a preferred embodiment of the invention is clearly shown.

IN THE DRAWINGS

Figure 2:
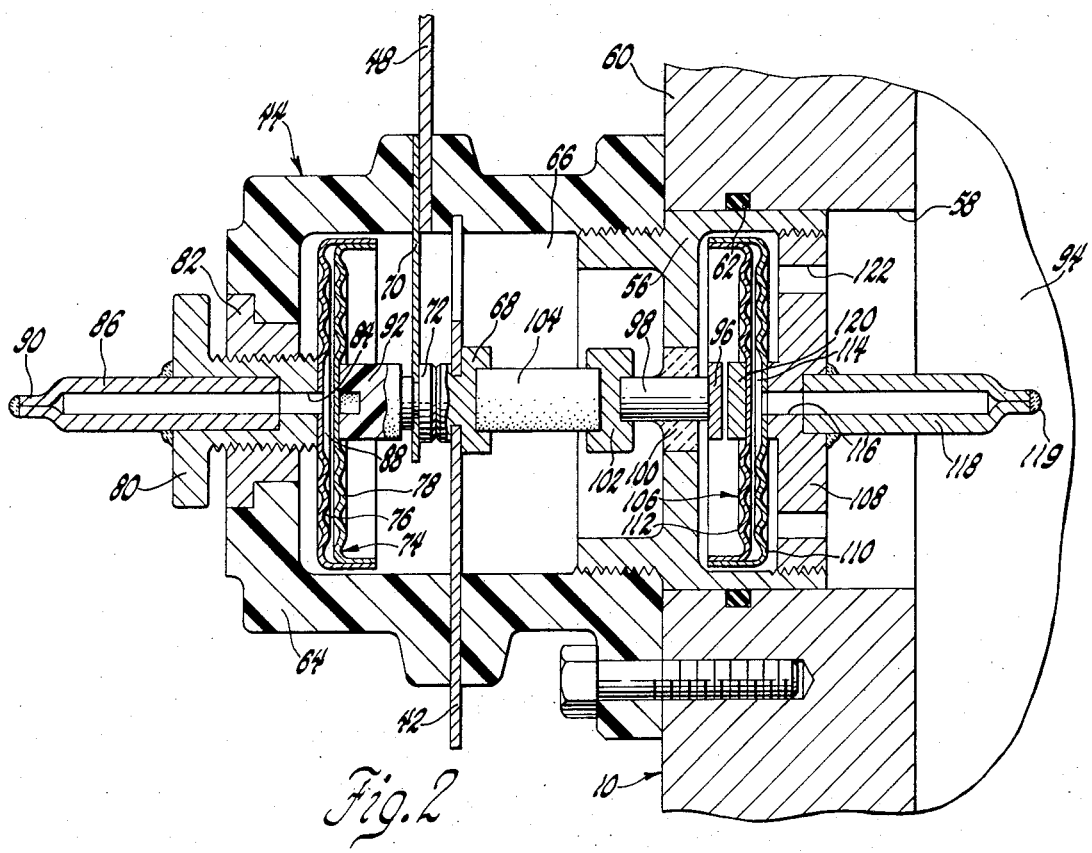

FIG. 1 is a diagrammatic view of an automobile air conditioning system including the combination switch assembly; and FIG. 2 is an enlarged sectioned view of the combination switch assembly shown in FIG. 1.

In FIG. 1 of the drawings, an air conditioning system is shown including a compressor 10, a condenser 12, a drier-receiver assembly 14, an expansion valve 16, an evaporator 18, and a suction throttling valve 20. These are all known elements used in automobile air conditioning systems. The compressor 10 is connected in refrigerant flow relation to the condenser 12 by a high pressure conduit or a line 22. The evaporator 18 and throttling valve 20 are connected in refrigerant flow relation to compressor 10 by a suction conduit or line 24. A refrigerant charged temperature bulb 26 and tube 28 sense evaporator outlet temperature to open and close the expansion valve 16.

The compressor 10 is rotated by the automobile's internal combustion engine (not shown) through an electromagnetic clutch 30 whenever the clutch coil 32 is energized. Electric power is applied to the coil 32 by a battery 34 through a conductor 36, a compressor protector fuse 38 and a conductor 40. The conductor 40 extends to a terminal 42 of the combination ambient temperature sensing and refrigerant temperature sensing switch assembly 44. A conductor 46 extends from a second terminal 48 of the switch assembly 44 to the coil 32. The coil 32 and battery 34 are grounded respectively by conductors 50 and 52. An on-off switch 54 is manually operated by the automobile driver to activate the air conditioning system when desirable.

The combination ambient sensing and refrigerant temperature sensing switch assembly 44 is shown in more detail in FIG. 2. A cylindrical housing portion 56 is supported within a bore 58 in the end 60 of the compressor 10. An O-ring type seal 62 prevents fluid leakage between the member 56 and the end 60. A cover housing member 64 is threadably secured to the housing 56 and supports terminals 42 and 48 therein. The member 64 is molded of an insulation type material.

The terminal 42 projects through the interior 66 of housing 64 and supports a contact 68 centrally within the interior 66. A contact arm 70 extends from the other terminal 48 into the interior 66 and supports a contact 72 normally spaced from contact 68 but shown in its closed position in FIG. 2. The contact 72 is moved to its closed position by the expansion of a sealed bellows type casing 74 within interior 66. The casing 74 is formed by joining the peripheral edges of two circular discs 76, 78. The disc 76 is fixedly supported by a threaded member 80 in a bushing 82 in cover member 64. A passage 84 and tube 86 lead to the interior 88 of the casing 74. The interior 88 is evacuated and subsequently filled with refrigerant before the end of tube 86 is crimped and brazed at 90 to seal the casing. A pad 92 supported upon the movable disc 78 engages one face of contact 72 and moves the contact against the adjacent contact 68 when the ambient temperature sensing switch closes in response to increasing temperatures sensed by tube 86 which causes expansion of casing 74. The contacts 68 and 72 may be set to close at a desirable ambient temperature of between 30° and 35° F. by turning the threaded member 80 within bushing 82 to calibrate the ambient temperature sensing switch portion.

As previously mentioned, the assembly 44 also includes a refrigerant temperature responsive switch portion adapted to close when the refrigerant temperature in the compressor inlet or suction cavity 94 exceeds a predetermined maximum temperature which corresponds to an undesirably low refrigerant charge level within the system. A fixed contact 96 is mounted on the end of a support 98 within the interior of housing 56. The contact 96 and post 98 are insulated from housing 56 by a glass seal 100. The contact 96 is electrically connected through post support 98 and a connector button 102 to one end of a thermistor 104. The other end of the thermistor 104 is connected to and supported by the contact 68 which is in the electric circuit with the fuse 38 and battery 34. A bellows-like sealed casing 106 is supported in spaced relation to contact 96 by a member 108 threadably secured to housing 56 within the suction cavity 94. The casing 106 includes two spaced circular discs 110, 112 joined together at their peripheral edges and enclosing an interior 114. A passage 116 in member 108 and a tube 118 are used to evacuate the interior 114 and fill it with refrigerant before end 119 is crimped and brazed together to seal the casing 106. A movable contact 120 is supported on disc 112 and spaced from contact 96 when the refrigerant temperature sensing portion of the switch assembly 44 is open as shown in FIG. 2. Ports 122 in member 108 permit the circulation of refrigerant from the suction cavity 94 around the casing 106. Thus, the casing 106 responds to changes in refrigerant pressure from the suction cavity 94 as well as changes in temperature. The glass seal 100 prevents refrigerant from entering interior 66.

When the refrigerant level within the system falls below a predetermined level, it has been observed that the temperature of refrigerant in the suction cavity 94 increases greatly and its pressure also decreases. This increased temperature or decreased pressure causes enclosed refrigerant within interior 114 of the casing 106 to expand and eventually to engage contacts 96 and 120. This completes a circuit from the battery 34 through the fuse 38, terminal 42, thermistor 104 and the housing 56 to ground. After the closing of contacts 96 and 120, the thermistor 104 initially has a relatively high resistance but after a brief time delay of about one or two minutes, its resistance falls and a low resistance circuit is completed which bypasses the coil 32 causing a large current to flow through the fuse 38. This large current blows the fuse 38 and deactivates the compressor 10.

A refrigerant used in the aforementioned air conditioning system is dichlorodifluoromethane with the chemical formula $CCl_2F_2$ commonly referred to as refrigerant 12. Refrigerant 12 has a boiling point at atmospheric pressure of about $-21.6°$ F. The charge level in many General Motors automobile air conditioning systems is approximately 4 lbs. of refrigerant. It has been observed that a charge of less than about 1 lb. of refrigerant may result in insufficient cooling and lubrication of the compressor.

When the refrigerant charge level is insufficient for cooling and lubricating the compressor, the superheat temperature of refrigerant in the compressor inlet or suction cavity 94 is significantly increased. Under normal operation with a full refrigerant charge and a heat load on the evaporator, the throttling valve 20 of the air conditioning system restricts refrigerant flow in the suction line to maintain a refrigerant pressure of about 30 psig which corresponds to a refrigerant temperature of 32° F. in the evaporator. If the vapor in the suction cavity is at 40° F. at 30 psig, its superheat is about 8° F.

When a relatively large heat load is placed on the evaporator, with a reduced refrigerant charge on one pound, the superheat of refrigerant in the compressor's inlet or suction cavity may exceed 140° F. This may correspond to a refrigerant temperature of 170° F. at about 30 psig or a lesser temperature of 120° F. at near zero psig. With a 4 pound refrigerant charge under the same conditions, a relatively low superheat temperatore of 10° – 15° F. would normally be expected which corresponds to about 32° F. at 30 psig. The contacts 96, 120 may be calibrated to desirably close at a superheat of about 141° F. corresponding to a refrigerant temperature of 120° F. at zero psig.

When the heat load on the evaporator decreases by operation of the system under low ambient temperature conditions with only a 1 pound refrigerant charge, the superheat in the compressor inlet may fall to only 45° F. This normally would be insufficient to close contacts 96, 120. However, under these conditions, the throttling valve 20 may completely shut off refrigerant flow to the compressor and a negative pressure condition will occur in the suction cavity. The combination of temperature and unusually low pressure will cause casing 106 to expand and engage contacts 96, 120 to terminate compressor operation. Thus, the pressure responsive characteristics of the refrigerant responsive portion of switch assembly 44 assume importance under low ambient temperature operation of the system.

Operation of the air conditioning system under some conditions with a full refrigerant charge may temporarily produce superheats which exceed the predetermined closing point of contacts 96, 120. For example, this can occur during rapid acceleration of the automobile or after consecutive stopping and starting of the compressor. The present refrigerant responsive switch portion of assembly 44 is insensitive to these transient temperature and pressure conditions. The thermistor 104 requires a brief period to become fully conductive after the contacts 96 and 120 engage and consequently blow fuse 38. After this delay, the opening of fuse 38 de-energizes the compressor 10.

Once the fuse 38 is blown and the circuit to the coil 32 is broken, the fuse must be replaced in order to once again energize the clutch of the compressor. Normally, replacement of the fuse is done by professional service which at the same time checks and replenishes the refrigerant charge. However, if the refrigerant charge is not replenished, and the fuse replaced, the system will not be damaged since the new fuse will be blown in the same manner as described above.

While the embodiment of the invention described above is a preferred embodiment, it should be understood that other embodiments may be adapted.

What is claimed is as follows:

1. A combination ambient air temperature and refrigerant temperature and pressure control for an automobile air conditioning system comprising: a compressor having an inlet; clutch means including an electrically responsive coil for transmitting power from the automobile engine to said compressor when the clutch coil is energized; a coil energization circuit including a battery and a fuse; ambient air temperature responsive switch means in said energization circuit which operates above a predetermined ambient air temperature to energize said coil; a refrigerant temperature and pressure responsive switch having a thermal bulb and a pressure responsive casing in fluid contact with refrigerant in the inlet of said compressor; said temperature and pressure responsive switch having a pair of contacts controlled by said casing adapted to close in response to predetermined refrigerant temperatures and pressures; means including said refrigerant responsive switch and a thermistor defining a ground circuit from said fuse in shunt relationship to said clutch coil; said thermistor having an initial high resistance upon closure of said pair of contacts to delay short circuiting of said fuse whereby transient high temperatures and low pressures of refrigerant will not deactivate said clutch coil; said thermistor having a reduced resistance following the delay to cause a large current to pass through said fuse to cause it to blow.

2. A combination ambient air temperature and refrigerant temperature and pressure control for an automobile air conditioning system comprising: a compressor having an inlet; clutch means including an electrically responsive coil for transmitting power from the automobile engine to said compressor when said coil is energized; a coil energization circuit having a battery and a fuse; an ambient air temperature responsive switch in said energization circuit which operates above a predetermined ambient air temperature to energize said coil; a refrigerant temperature and pressure responsive switch in fluid contact with refrigerant in the inlet of said compressor adapted to close in response to predetermined refrigerant temperatures and pressures; said switches having circular discs in spaced relation to one another with their peripheral edges joined and with the space therebetween filled with refrigerant; one of each pair of spaced discs being fixedly supported by a switch housing; movable contacts on the other of each pair of spaced discs; fixed contacts supported by said switch housing in spaced relation to said movable contacts when said switches are open; means including said refrigerant responsive switch and a thermistor in circuit with said battery and said fuse to bypass the clutch coil and short circuit said fuse when said contacts of said refrigerant responsive switch are closed; said thermistor operating to delay short circuiting of said fuse whereby temporary increases in refrigerant temperature and temporary decreases in refrigerant pressure will not de-energize said compressor.

* * * * *